UNITED STATES PATENT OFFICE.

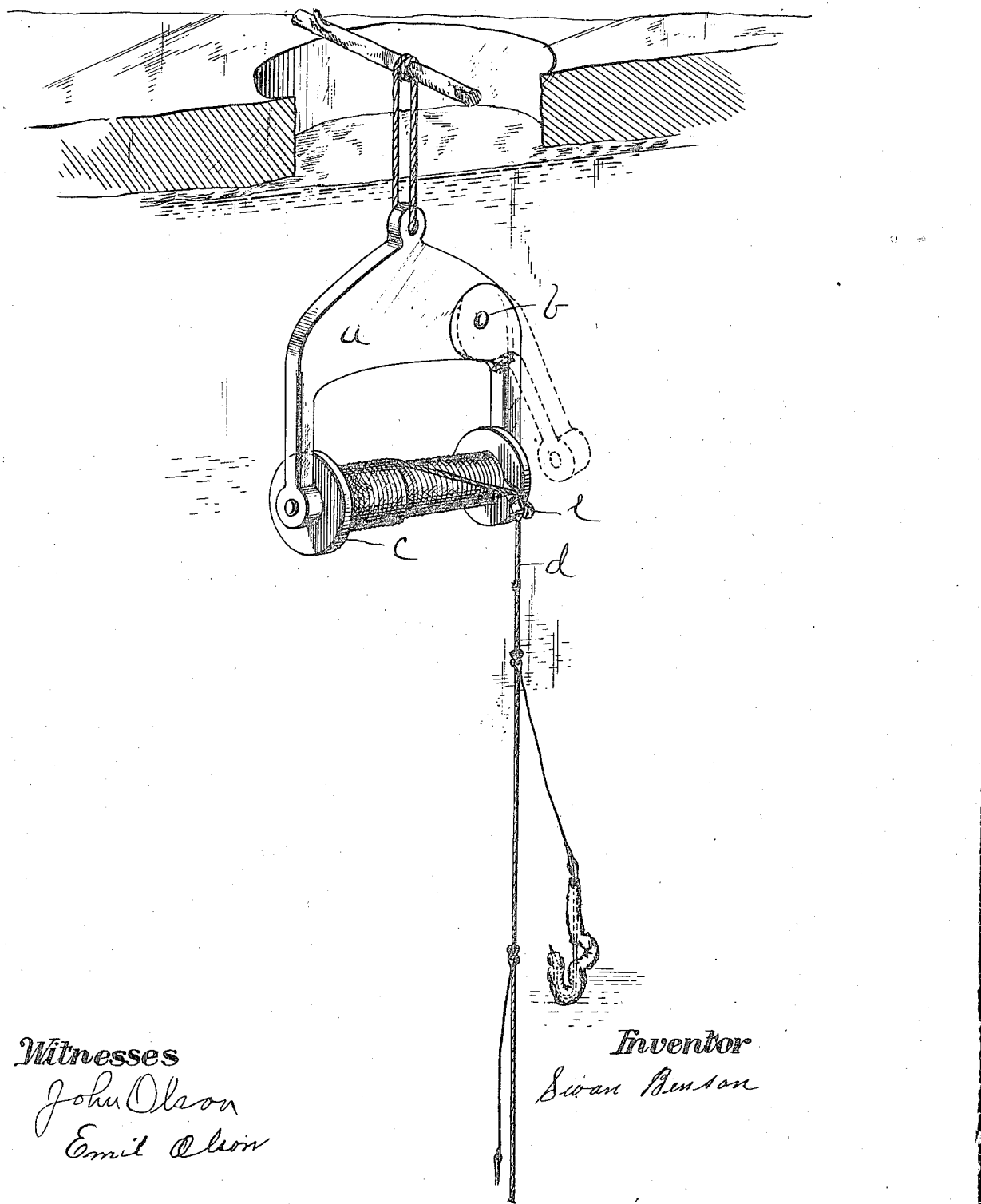

SWAN BENSON, OF TWO HARBORS, MINNESOTA.

FISHING-REEL.

1,182,523.  Specification of Letters Patent.  Patented May 9, 1916.

Application filed July 17, 1914. Serial No. 851,481.

*To all whom it may concern:*

Be it known that I, SWAN BENSON, a citizen of Sweden, residing at Two Harbors, in the county of Lake and State of Minnesota, have invented certain new and useful Improvements in Fishing-Reels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide a fishing reel that can at all times be wholly submerged under the ice and thus be free from any interference by ice or cold weather and adapted to support a line to which a series of hooks may be attached and placed at any desired interval, the reel being provided with means to grip the line so that the line may be adjusted to any desired depth and there securely held in place, or be automatically loosened and extended its full length at the will of the fish that takes the hook.

The drawing shows a perspective view of the reel suspended under the ice.

The reel frame $a$, is made in shape of a fork with two prongs, one of said prongs being pivotally mounted upon the frame by means of the pivot $b$. The spool $c$, is placed between said prongs, a line $d$, is wound around said spool and held in any desired place by means of a catch or clutch $e$, when the fish takes the hook a slight pull on the line releases the line from the said clutch or catch, the hooks are attached to the line $d$, at any desired intervals as may be deemed advisable.

The operation is as follows: The frame of said reel being made in a fork like shape, having one of its prongs adjustable, the spool is placed between said prongs, a suitable line is secured on the spool, a catch or clutch is made fast on the spool, the line passed through said clutch, when the fish or other reptile takes the hook a slight pull on the line releases the line from the clutch and the line allows the fish to play around the full length of the line thus it will be tired out before the end of the line is unwound from the spool and thus prevent the breaking of the line; a hook or a number of them being placed on the same line, the reel is then lowered into the water any desired depth and secured in any suitable manner.

Having thus described my invention, what I caim as new and desire to secure by Letters Patent of the United States of America is:

A fishing reel adapted to be submerged under the ice and consisting of a frame made in the shape of a fork with one of its legs or prongs pivotally mounted on one side of the frame and adjustable about its pivot, a spool with a line secured thereon rotatably mounted between said prongs, one end of said spool being provided with a suitable catch or clutch adapted to engage said line and hold the same until disengaged by a pull on said line, substantially as described and shown.

In testimony whereof, I affix my signature, in presence of two witnesses.

SWAN BENSON.

Witnesses:
JOHN OLSON,
EMIL OLSON.